L. V. PENCE.
TWO-CYCLE COMBUSTION ENGINE.
APPLICATION FILED APR. 29, 1909.

1,043,537.

Patented Nov. 5, 1912.

WITNESSES:
W. M. Gentle
O. M. McLaughlin

INVENTOR.
Lafe V. Pence.
BY
V. H. Lockwood
ATTORNEY.

L. V. PENCE.
TWO-CYCLE COMBUSTION ENGINE.
APPLICATION FILED APR. 29, 1909.

1,043,537.

Patented Nov. 5, 1912.

WITNESSES:
W. M. Gentle.
O. M. McLaughlin

INVENTOR.
Lafe V. Pence.
BY
V. H. Lockwood.
ATTORNEY.

L. V. PENCE.
TWO-CYCLE COMBUSTION ENGINE.
APPLICATION FILED APR. 29, 1909.

1,043,537.

Patented Nov. 5, 1912.
7 SHEETS—SHEET 4.

WITNESSES:
W. M. Gentle
O. M. McLaughlin

INVENTOR.
Lafe V. Pence.
BY
V. H. Lockwood
ATTORNEY.

L. V. PENCE.
TWO-CYCLE COMBUSTION ENGINE.
APPLICATION FILED APR. 29, 1909.

1,043,537.

Patented Nov. 5, 1912.

WITNESSES:

INVENTOR.
Lafe V. Pence.
BY
ATTORNEY.

L. V. PENCE.
TWO-CYCLE COMBUSTION ENGINE.
APPLICATION FILED APR. 29, 1909.

1,043,537.

Patented Nov. 5, 1912.
7 SHEETS—SHEET 6.

WITNESSES:

INVENTOR.
Lafe V. Pence.
BY
V. H. Lockwood
ATTORNEY.

UNITED STATES PATENT OFFICE.

LAFE V. PENCE, OF INDIANAPOLIS, INDIANA.

TWO-CYCLE COMBUSTION-ENGINE.

1,043,537.  Specification of Letters Patent.  Patented Nov. 5, 1912.

Application filed April 29, 1909. Serial No. 492,855.

*To all whom it may concern:*

Be it known that I, LAFE V. PENCE, of Indianapolis, county of Marion, and State of Indiana, have invented a certain new and useful Two-Cycle Combustion-Engine; and I do hereby declare that the following is a full, clear, and exact description thereof, reference being had to the accompanying drawings, in which like letters refer to like parts.

The object of this invention is to improve the construction of four-cylinder two-cycle internal combustion engines, preferably those operated by hydro-carbon oil, alcohol, or the like, so as to always receive and fire full cylinder charges even when running at the highest speeds.

One feature of the invention consists in arranging the cylinders in pairs and preferably casting the lower or pumping ends of the cylinders together and arranging the same so that the pistons in the cylinders will coöperate to pump air into the combustion ends of the cylinders.

The pumping ends of the cylinders are enlarged somewhat and the pistons are provided with enlargements operating in the pumping end and each cylinder opens into a crank chamber for each piston and is in communication through a cored passageway with the other cylinder of the pair at a point beyond the enlargement on the piston, whereby both pistons pump air to the combustion ends of the cylinders while moving in each direction. This makes the engine very effective. The cored passageways extend diagonally from the crank chamber associated with one cylinder to a port in the other cylinder beyond the enlargement of its piston, and are arranged between the integrally constructed cylinders so that the construction is very compact. The crank chamber for each piston is separate and is provided with a piston controlled valve, which alternately admits air into said crank chamber and permits air to be forced out of the crank chamber to the combustion ends of the cylinders. Hence both pistons of the pair of cylinders simultaneously coact to draw air into one of the two crank chambers and at the same time to force air out of the other crank chamber to the combustion ends of the cylinders.

When four cylinders, or more than a pair of cylinders, are used, the operation of the pistons is successive, and all of the pistons force air into a chamber or passageway that is in communication with the explosive ends of all the cylinders, so that air will be forced in the explosive end of any cylinder that is open. Along with this idea is the arrangement of valves in the explosive ends of all the cylinders, which are controlled by the crank shaft, so that said valves of the different cylinders will open in succession. To prevent the valves in the explosive ends of the cylinders from closing too suddenly and with too much force and jar, they are provided with a double surface, one surface having the same diameter as and fitting within the port as the valve closes, and the other surface overlapping the port, whereby the valve may close slowly.

The full nature of this invention will be understood from the accompanying drawings and the following description and claims:

Figure 2:
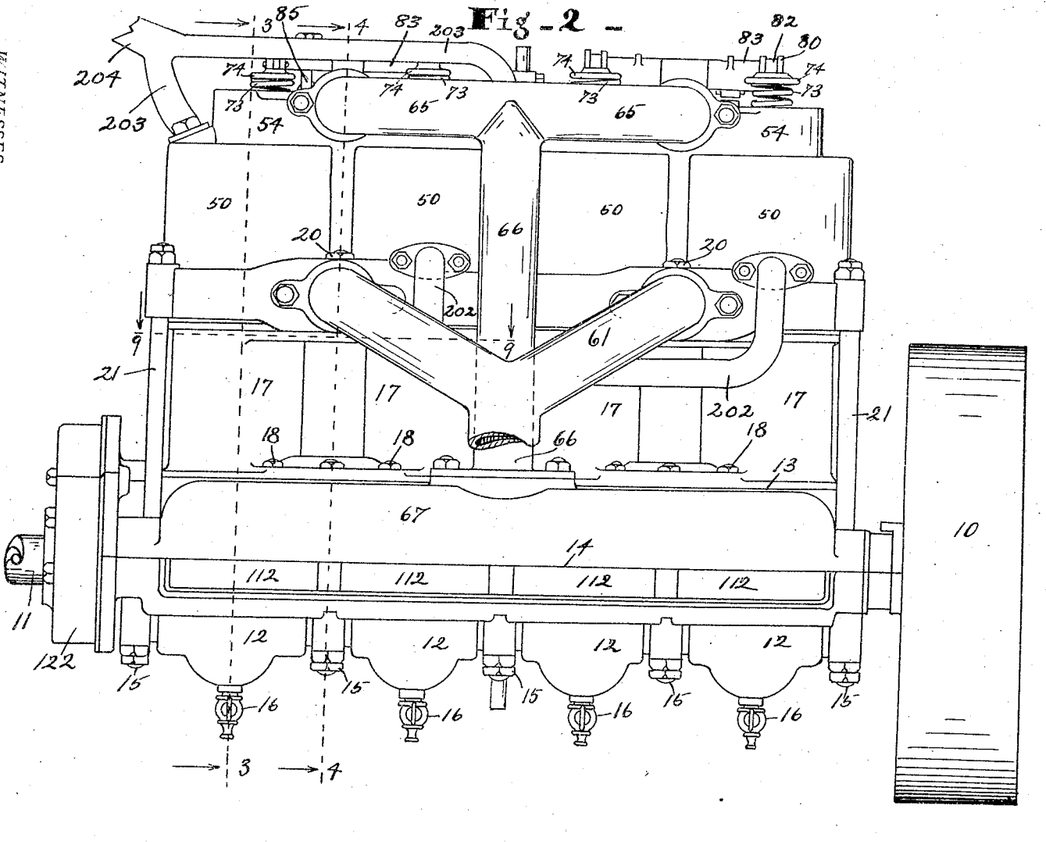
Fig. 2 is an elevation of the right-hand side of the engine with an exhaust pipe and other parts partly broken away.
Figures 4, 5, 6:
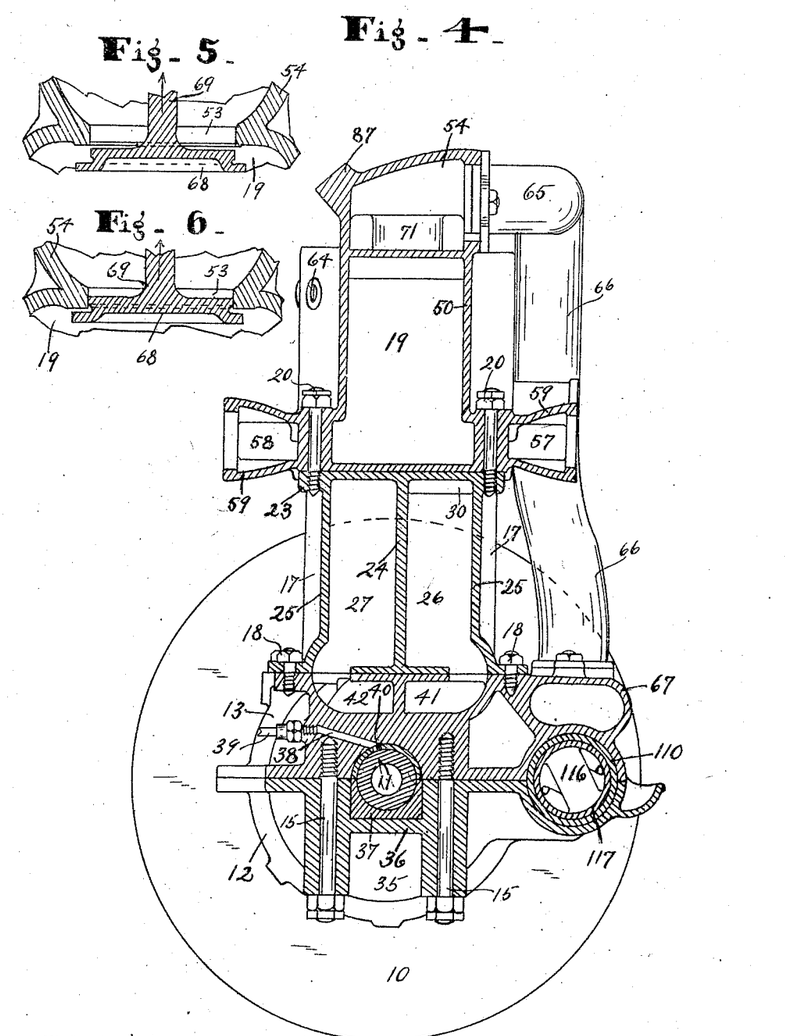
Fig. 4 is a transverse section on the line 4—4 of Fig. 2.
Fig. 5 is a section through the central portion of the upper end of a cylinder, the remainder of the cylinder being broken away and the air controlling valve shown in its position at the moment the piston closes the exhaust port.
Fig. 6 is the same showing the valve still further moved toward the closing position, the air port being entirely closed but the valve still having room for further closing movement.

In detail there is shown in the drawings herein a fly wheel 10 on the crank shaft 11, which is mounted in the crank case, which consists of a lower portion 12 and an upper portion 13, the same being horizontally separated at the line marked 14 in Fig. 2. The crank shaft has four cranks as there are four pistons and cylinders. The two halves of the crank case are secured by the bolts 15. Each crank operates in an independent chamber, so that the crank case is divided into four chambers separated by partitions 35. There are ribs or plates 36 extending across the crank case between the cranks of the crank shaft that support the bearings 37 for the crank shaft 11. There is a lubricating passageway 38 provided in an inclined position in the cast portions of the crank case between the chambers thereof, as indicated in Fig. 4, that leads from a suitable external means 39 for supplying lubricant, and the port 40 in the bearing 37 enables oil to come in contact with the shaft 11 for lubricating it. There are waste cocks 16 at the bottom of each section of the crank case, and also a lubricating oil overflow pipe 43 in each section of the crank case.

Figure 9:
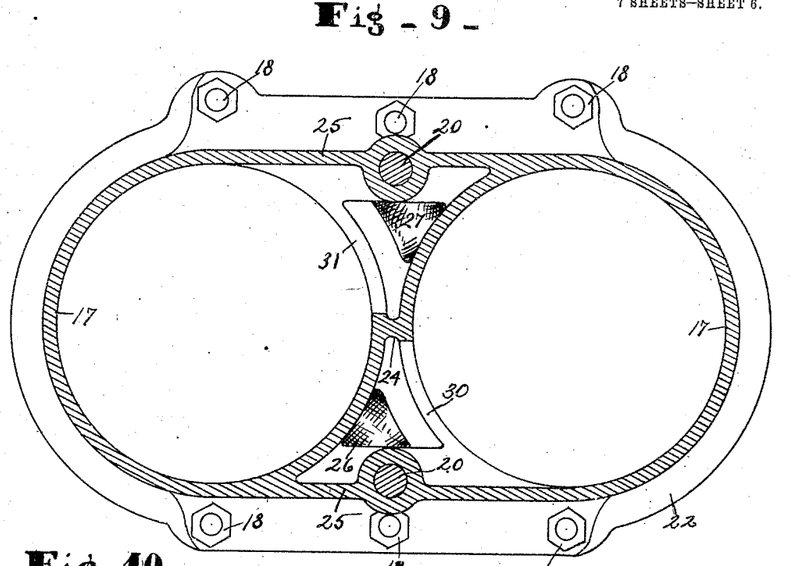
Fig. 9 is a horizontal section on the line 9—9 of Fig. 2, cutting through two cylinders, with the pistons removed.

Upon the upper portion 13 of the crank case are mounted the lower portions or members 17 of the four cylinders. These cylinders are arranged in pairs, as shown in Fig. 9, and are held in position by the bolts 18 and the stanchions 21. The upper portions or members 19 of said cylinders rest upon the lower portions and are secured and held thereon by the bolts 20 and the stanchions 21 that extend from the upper members 19 of the cylinders into the upper section 13 of the crank case, so that said stanchions tend to hold both portions of the cylinders in place on the crank case.

The lower members 17 of the cylinders are formed of single thickness with no water jacket, and a pair of them are cast together, as shown in Fig. 9, with a flange 22 at the bottom through which the screws 18 extend and a flange 23 at the top for the bolts 20. The two cylinders are centrally connected by a vertical web 24 and also by side plates 25, so as to form between said pair of cylinder members two vertical passageways 26 and 27, as seen in Fig. 9, the purpose of which will be explained later. There is a hole 28 through the upper part of the member 17 of the cylinder for the lubricating oil connection 29, see Figs. 1 and 3. Also, near the upper ends of the members 17 of the cylinders there are circumferentially disposed ports 30 and 31, see Fig. 9, one in each cylinder, and the two ports lie diagonally opposite to each other, the port 30 in the right-hand cylinder being in communication with the passageway 26, and the port 31 being in communication with the passageway 27. Said passageways 26 and 27 communicate with and open at their lower ends into pockets 41 and 42, respectively, in the upper portion of the crank case. The pocket 41 communicates with the forward or left-hand chamber of the crank case, as shown in Fig. 3 and viewed as indicated in Fig. 2, while the pocket 42 communicates with the next chamber of the crank case.

Figure 3:
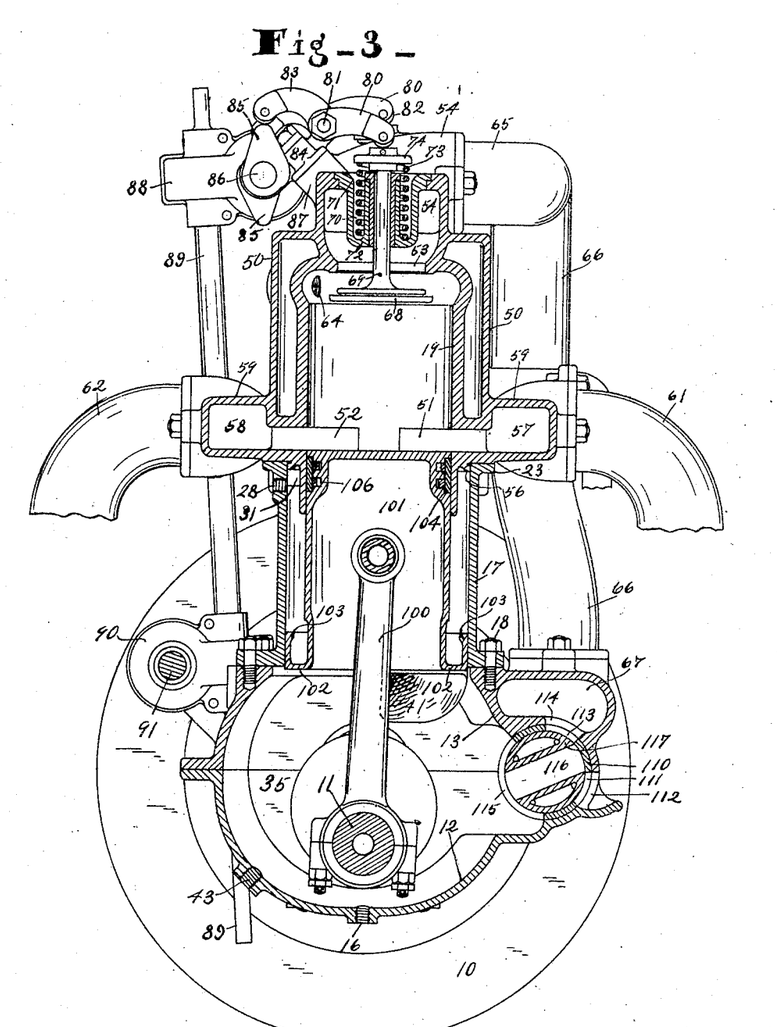
Fig. 3 is a transverse section on the line 3—3 of Fig. 2.

The upper members 19 of the cylinders are formed as indicated in Figs. 3 and 4, with a water jacket 50 and provided with circumferential, almost semi-circular, exhaust ports 51 and 52 on the sides at the lower end and near the connection with the lower section 17 of the cylinders, and at the upper end there is a large inlet port 53 leading from a chamber 54 which forms an upward extension of the cylinder wall, as shown in Fig. 3. Said upper section 19 of the cylinders has annular downwardly extending lugs or ribs 56 adapted to fit within the upper ends of the lower section 17 of the cylinders for holding the two parts in place. The upper cylinder wall 19 extends within the lower cylinder section 17 and below the top of such lower cylinder section, as shown in Fig. 3, and the upper cylinder section 19 is of less diameter than the lower cylinder section 17. The outer water jacket 50 is of substantially the same diameter as the lower cylinder section 17, although this feature is not necessary.

The two exhaust ports 51 and 52 open into chambers 57 and 58, respectively. The chamber 57 in the casing 59 communicates with the two ports 51 in the two cylinders, and in like manner, chamber 58 communicates with both ports 52, and from said chambers there are exhaust pipes 61 and 62, respectively, so that the exhaust ports 51 and 52 have entirely independent exhaust conduits; and also each of said ports extends almost half the way around the cylinder, so that when the ports are uncovered by the piston, there is immediate exhaust of all the burnt gas in the cylinder. The upper section 19 of each cylinder has near the upper end a pair of spark plug holes 64, one of which appears in these drawings and the other is omitted, and also there is a hole, not herein shown, for the fuel inlet nozzle.

The chamber 54, like the chambers 57 and 58, extends to both cylinders of a pair of cylinders, and to said chamber the horizontal pipe 65 is connected. It is a T-pipe on the upper end of the pipe 66 leading from the chamber 67 in communication with the crank chambers, as shown in Figs. 3, 4, 10 and 11. The purpose of the pipes 65 and 66 and chamber 54 is to supply air to the upper end of the cylinders, which enters through the ports 53 therein. Each of said ports is controlled by a double valve 68 at the lower end of the valve stem 69, which operates in the bushing 70 of the round bearing piece 71. This bearing piece 71 has a central cylindrical portion 72 in which bushing 70 fits and around which a spiral spring 73 is placed, that acts upwardly against the disk 74 secured to the upper end of the valve stem 69. Said piece 71 fits in an opening at the upper end of the case 54 and the action of the spring 73 is to close the double valve 68 by forcing the same upwardly.

The double valve 68 is of peculiar construction inasmuch as it is formed of upper and lower disks of different diameters, the upper disk being of the same diameter as the port 53 and the lower disk being of larger diameter so as to overlap the port 53. The purpose of this is to enable the valve to seat slowly and close the port 53 before the valve is completely seated, whereby the valve will hold the air in the cylinder and yet seat slowly and prevent a shock or jar.

Figure 1:
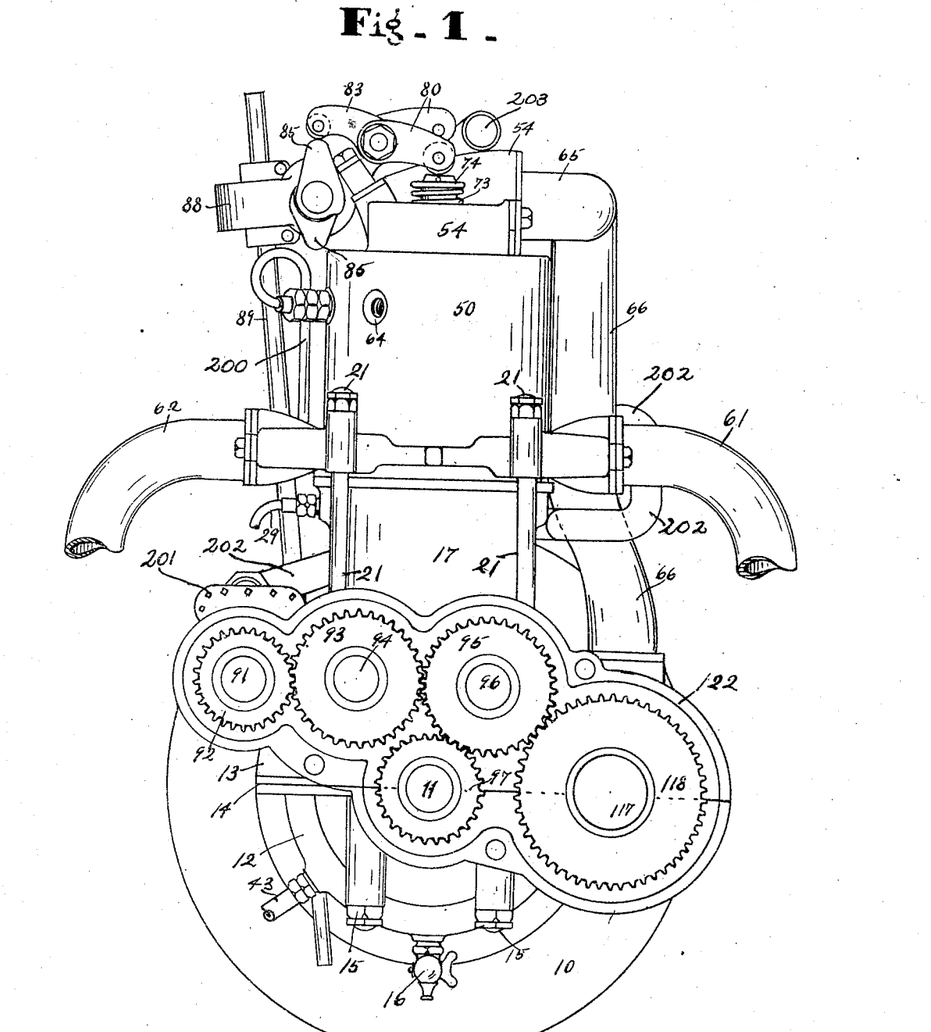
Figure 1 is a front elevation of the engine with parts broken away and with the gear case cover removed.

The double valve 68 is opened by the rocker arm 80, which is secured at one end on the rod 81 and at the other end has a roller 82 that bears upon the upper end of the valve stem 69. An oppositely extending arm 83 from the rod 81 has on its end a roller 84 that engages the cam 85, which is keyed on the shaft 86. The rod 81 and shaft 86 are mounted in connection with supports 87 connected with the cylinders. The shaft 86 is driven by gears in the gear case 88 that is loosely mounted on the shafts 86 and 89 and contains meshing gears, not shown, secured on said shafts 86 and 89. The shaft 89 is driven by worm gears in the gear case 90, shown in Fig. 3, which is mounted loosely on the shafts 89 and 91. In said gear case 90 there are gears not shown, one on the shaft 89 and one on the shaft 90, and meshing with each other. The shaft 91 is driven, as shown in Fig. 1, by a gear 92 secured thereon that meshes with the gear 93 on the short spindle 94 connected with the gear case 122. The gear 93 meshes with the gear 95 on a spindle 96, and the gear 95 meshes with gear 97 secured on the crank shaft 11. Through the mechanism described, therefore, the operation of the valves 68 is timed and controlled by the crank shaft. The intermediate drive mechanism referred to is so arranged that the shaft 86 will revolve at the same speed as the crank shaft, and on said shaft 86 there are four cams 85 engaging respectively four sets of arms 83 and 80 on the rod 81, there being one rod 81 for each pair of cylinders. The cams 85 for the cylinders for each pair are arranged 180 degrees apart, as shown in Fig. 3, whereas the two middle or intermediate cams 85 are 90 degrees apart. Therefore, the action of the valve 68 on all four cylinders is timed and controlled by the crank shaft to agree with the movement of the pistons.

Figure 7:
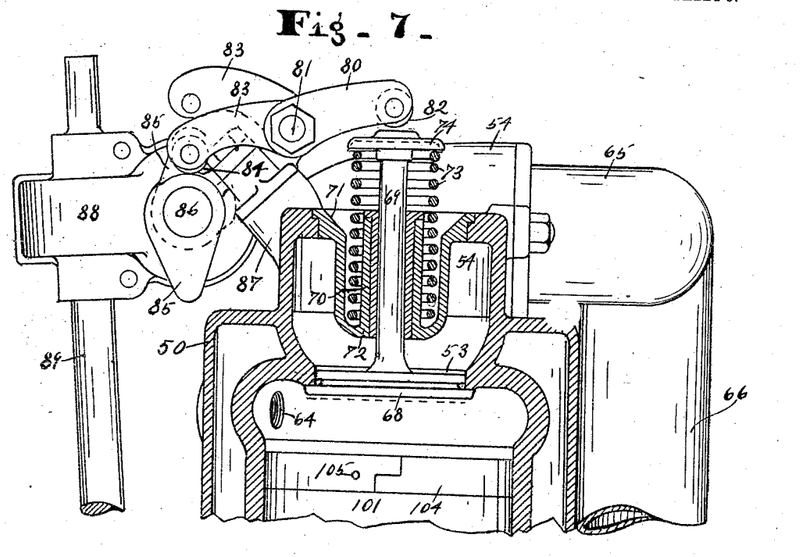
Fig. 7 is the same as the upper part of Fig. 3 on a larger scale and showing the air controlling valve completely seated and showing the upper end of the piston, which is in its extreme upper position, the lower parts of the device being broken away.
Figure 8:
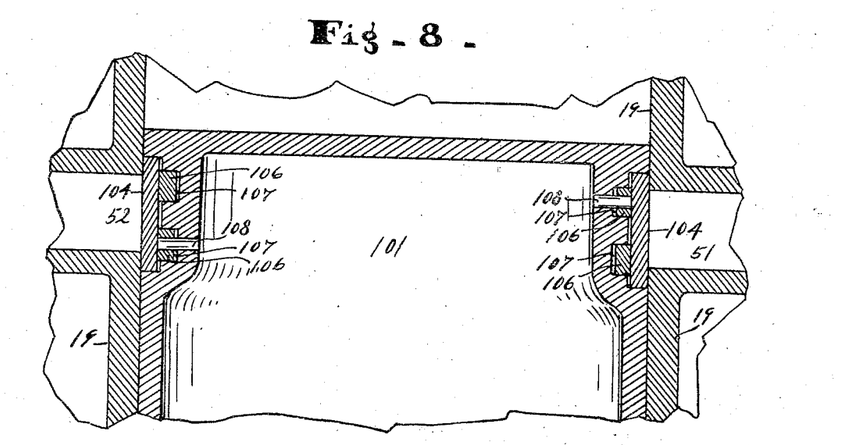
Fig. 8 is a reproduction of the central portion of Fig. 3, but with the piston moved somewhat farther upward so as to close the exhaust ports, the same being shown on a larger scale and parts being broken away.

The piston rods 100 are connected with pistons 101 of peculiar construction. The pistons are hollow with the lower end open, through which the piston rods extend and with the top closed. The main portion of the piston has the same diameter as the upper member 19 of the cylinder, but the lower ends of the pistons are externally enlarged by the addition of a radial annular extension of flange 102 and an upwardly extending rim 103 from the flange 102 that is cylindrical and fits and operates snugly within the lower member of the cylinder 17, which is of larger diameter than the upper member 19. The purpose of the rim 103 extending upwardly is to diminish the length of the piston. There is a packing ring 104 embedded in the piston that is held from rotation from the pin 105, see Fig. 7, secured to the piston and said ring has within it two smaller packing rings 106, which are in recesses 107 and prevented from rotating by pins 108. The ring 104 is wider than the exhaust ports 51 and 52 so it will not expand into the exhaust ports and catch, since the exhaust ports almost encircle said ring.

Figures 10, 11:
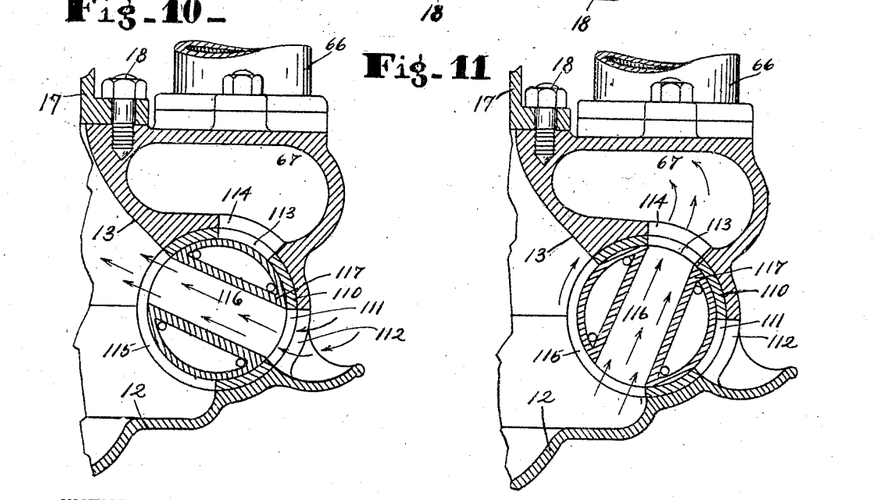
Fig. 10 is a reproduction of the lower right hand portion of Fig. 3 on a larger scale and showing the position of the valve for admitting air to the crank chamber.
Fig. 11 is the same with the valve shown in position for the passage of air from the crank chamber toward the explosive end of the cylinder.
Figure 12:
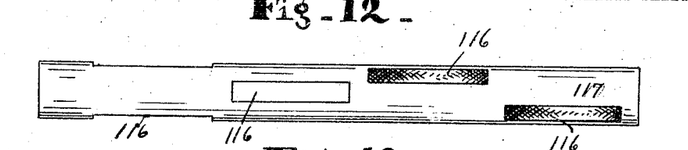
Fig. 12 is a plan view of the air controlling valve for all the crank chambers.
Figure 13:
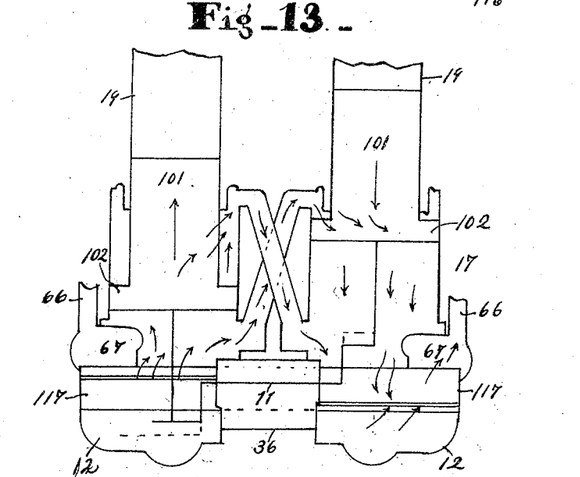
Fig. 13 is a diagrammatic view of a pair of cylinders and pistons with associated parts, showing the direction of air into the crank chambers and cylinders and out of the same when one piston is going up and the other going down.
Figure 14:
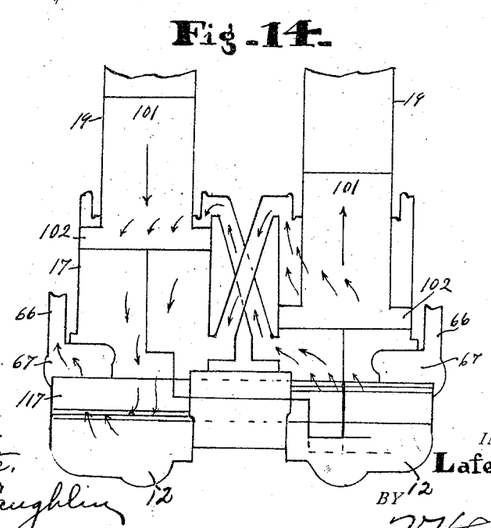
Fig. 14 is the same when the movement of the pistons is reversed.

In this engine air is forced alternately into the two ends of each pair of cylinders by the pistons. The chamber 67 extends laterally for the full length of the crank case and receives air from the various individual crank chambers successively, and the air is supplied therefrom through the tubes 66 and 65 to any of the four cylinders that may be in condition to receive the air through the port 53. Hence said chamber 67 is in communication with all the cylinders, and every piston, as it moves downwardly, forces air into said chamber 67, and as it moves upwardly, draws air into the crank case. A single valve is employed for regulating the inlet of air to each crank chamber and outlet of air therefrom to the chamber 67, which is shown in Figs. 10 and 11.

For the full length of the crank case there is a cylindrical valve case 110. It is fixed and there are four ports 111, one for each crank chamber, which register with four ports 112 in the lower section 12 of the crank case. Said valve casing 110 has also four ports 113 registering with ports 114 entering the chamber 67. Said valve casing 110 has also four ports 115 to the crank chambers and about 120 degrees in length, so that the ports 116 through the rotary valve 117 will always register with the port 115 when it is registering with either the ports 111 or 113. The four ports 116 are not in the same plane, but are in staggered relation to each other and arranged in succession or order, as indicated in Fig. 11, that is, about 45 degrees apart, so that as the valve 117 rotates, these ports will be brought in orderly succession with the ports 111 and 113. The ports 111 and 113 are from center to center 90 degrees apart. Therefore, the pair of ports 116 at each end of valve 117 are simultaneously in registration with the two ports 111 and 113, respectively. At the same time the other two ports 116 will be closed. When one port gradually approaches the closing position, another port will at the same time be gradually approaching the open position. Therefore, there will always be exactly the same port space open through the valve 117, such port space always being the equivalent of two ports, but one of said ports or the equivalent port space is always admitting air into the crank chambers, while the other port or equivalent port space is always admitting air from the crank chambers to the chamber 67.

The valve 117 is rotated by intermediate gearing with the crank shaft 11, as indicated in Fig. 1. On the end of the rotary valve 117 a gear 118 is secured that meshes with the gear 95 mounted on a short spindle 96 secured to the gear case 122, and which meshes with the gear 97 on the crank shaft. These gears are within the gear case 122. The gear 118 is double the size of the gear 97, so that the valve 117 rotates at half the speed of the crank shaft 11.

The function of the chambers 26 and 27 and the pockets 41 and 42, as well as the ports 30 and 31, which communicate with the lower parts of two cylinders, is to augment the air pumping capacity of the individual crank chambers. This arises both from the increased amount of pumping area of the pistons, and also both pistons in each pair of cylinders coöperate simultaneously to pump air in one of said combined air chambers. In other words, the two pistons simultaneously draw air into one crank chamber and pump or force it out of the other one into chamber 67. As each piston rises, the external radial flange 102 forces air out of the lower part of the cylinder 17 through one of the chambers 26 or 27 and out of the crank chamber of the other adjacent piston; and at the same time, the other adjacent piston is descending and also pumping or forcing the air out of its crank chamber into chamber 67. The cranks of the first two pistons are, therefore, set 180 degrees apart, and likewise the cranks of the second two pistons are 180 degrees apart; but the cranks of the second and third pistons would be 90 degrees apart. Hence when one piston moves upwardly and forces air into the crank chamber under the adjacent piston, such first piston is at the same time drawing air into its crank chamber and the upper surface of the external flange at the lower end of the adjacent piston, since it is moving downwardly, is also drawing air into the crank chamber under the first piston and drawing air from such crank chamber into the passageway 26 or 27 and the lower part of the cylinder of such second piston. Thus it is seen that on account of the large capacity of the charging ends of the pistons, this engine will thoroughly scavenge and receive full charges even when running at extremely high speeds. The charges of air will completely fill the combustion chambers, and piston displacement above the top of the exhaust ports, and as the said charges are above atmospheric pressure at the time of charging, they are about one-fifth larger in volume than the piston displacement volume. As each cylinder receives and fires a charge during every revolution of the crank shaft, the engine will give the maximum possible power for its bore and stroke.

It is observed that the charges are not precompressed and then allowed to pass by mere expansion into the cylinders, as is frequent in two-cycle engines, but they pass directly as pumped to the cylinders, the inlet valves of the cylinders being mechanically opened. The inlet and exhaust passages are large enough to handle the charges and gas at high speeds with low pressure, which gives the engine high efficiency, as the power generated is not heavily drawn upon to perform the internal operations of the engine. Because of the large air charges, there will always be ample oxygen to burn completely all the fuel oil fed to the cylinders, thus preventing waste of fuel and fouling of the cylinder walls by incomplete combustion. This insures a full power output for the amount of fuel oil used.

The engine is efficient at low speeds and light loads as well as high speeds for the inlet air piping is never throttled. Throttling the air throws a heavy load on the engine by having to draw its fresh gas in through a restricted aperture, and at low speeds only a few ounces pressure is required to pump the fresh charges to the cylinders. As the engine receives four impulses per revolution, giving constant steady torque, it can be throttled to very low speeds. There is never any more pressure on the air pumping piston surfaces than is required to overcome the friction of the air in passing through the piping and inlet valve port, and displacing the burnt gas unexhausted from the cylinders.

200 is a tube for conveying fuel to the cylinder leading from any suitable fuel supplying means.

201 is a water pump from which water is driven by means not shown, and the water passes through pipe 202 to the water jackets and from them the water passes out through pipes 203 and pipe 204. The fuel and water supplying means are not fully shown herein, as they constitute no part of my invention.

What I claim as my invention and desire to secure by Letters Patent is:

1. An internal combustion engine including a pair of cylinders each having an explosive end and an air pumping end, pistons therein, a crank shaft connected with said pistons so that the pistons will move in opposite directions, a crank chamber for each cylinder which is in communication with the air pumping end of said cylinder below the piston therein and with the air pumping end of the cylinder for the other crank chamber above the piston therein, an air passageway for each crank chamber to the explosive ends of both cylinders, valves controlling the admission of air from said passageways to the explosive ends of said cylinders, a valve for controlling the admission of air into each crank chamber and therefrom into said passageway to the explosive ends of the cylinders, and means controlled by the crank shaft for operating all of said valves so that air is introduced into said crank chambers alternately and there is alternate admission of air into a crank chamber and the passage of air from said crank chamber to the explosive end of a cylinder, substantially as set forth.

2. An internal combustion engine including a pair of cylinders each having an explosive end and an air pumping end, pistons therein having each an annular enlargement operating in the air pumping end of the cylinder, a crank shaft connected with said pistons so that the pistons will move in opposite directions, a crank chamber for each cylinder which is in communication with the air pumping end of its own cylinder below the piston and with the companion cylinder above said enlargement of the piston therein, an air passageway from each crank chamber to the explosive ends of both cylinders, valves controlling the admission of air from said passageways into the explosive ends of said cylinders, a valve for controlling the admission of air into each crank chamber and therefrom to said passageway to the explosive ends of the cylinders, and means controlled by the crank shaft for operating all of said valves so that air is introduced into said crank chambers alternately and there is alternate admission of air into a crank chamber and into the explosive end of a cylinder, substantially as set forth.

3. An internal combustion engine including a pair of cylinders each having an explosive end and an air pumping end, pistons therein, an air reservoir in communication with the explosive end of both cylinders, a crank shaft connected with said pistons so that the pistons will move in opposite directions, a crank chamber for each cylinder which is in communication with said air pumping end of the cylinder below the piston therein and with the air pumping end of the cylinder for the other crank chamber above the piston therein, a passageway from each crank chamber into said air reservoir, valves for controlling the admission of air from said reservoir into the explosive ends of said cylinders, a valve for controlling the admission of air into each crank chamber and therefrom to said passageway to said reservoir, and means controlled by the crank shaft for operating all of said valves so that air is introduced into said crank chambers in rotation and there is alternate admission of air into a crank chamber of one cylinder and into said passageway leading to said reservoir and into the explosive end of the other cylinder of said pair of cylinders, substantially as set forth.

4. An internal combustion engine including a pair of cylinders each having an explosive end and an air pumping end, pistons therein, a crank shaft connected with said pistons so that the pistons will move in opposite directions, a crank chamber for each cylinder which is in communication with the air pumping end of its own cylinder below the piston therein and with the air pumping end of the cylinder for the other crank above the piston therein, an air passageway from each crank chamber to the explosive ends of both cylinders, valves controlling the admission of air from said passageways into the explosive ends of said cylinders, means actuated by the crank shaft for operating said valves, a valve for controlling the admission of air into each crank chamber and therefrom to said passageway to the explosive ends of the cylinders, and means actuated by the crank shaft for operating said last mentioned valve so as to alternately admit air to a crank chamber and to the passageway leading to the explosive ends of the cylinders, said valve operating means being operatively connected with the crank shaft so that the admission of air to the crank chamber and the admission of air to the explosive end of the cylinder for said crank chamber will be alternated.

5. An internal combustion engine including a plurality of pairs of cylinders and each cylinder having an explosive end and an air pumping end, pistons therein, a crank shaft connected with said pistons so that the pistons of each pair of cylinders will move in opposite directions, a crank chamber for each cylinder which is in communication with the air pumping end of its own cylinder below the piston therein and with the air pumping end of the cylinder for the other crank chamber of the pair of cylinders above the piston therein, a reservoir in communication with the explosive ends of all the cylinders, an air passageway from each crank chamber to said air reservoir, valves for controlling the admission of air from said reservoir into the explosive ends of said cylinders, a valve for controlling the admission of air into each crank chamber and therefrom to said passageway to said reservoir, and means controlled by the crank shaft for operating all of said valves so that air is introduced into the crank chambers of each pair of cylinders alternately and there is alternate admission of air into a crank chamber and admission of air into the passageway from said crank chamber to said reservoir and into the explosive end of a cylinder, substantially as set forth.

6. An internal combustion engine, including a plurality of pairs of cylinders, each cylinder having an explosive end and an air pumping end, pistons therein having each an annular enlargement operating in the air pumping end of the cylinder, a crank shaft connected with said pistons so that the pistons for each pair of cylinders will move in opposite directions, a crank chamber for each cylinder which is in communication with the air pumping end of its own cylinder below the piston and with the companion cylinder above said enlargement of the piston therein, a reservoir in communication with the explosive ends of all the cylinders, an air passageway from each crank chamber to said reservoir, valves for controlling the admission of air from said reservoir into the explosive ends of said cylinders, a valve for controlling the admission of air into each crank chamber and therefrom into the passageway leading to the reservoir, and means controlled by the crank shaft for operating all of said valves so that air is introduced into the crank chambers of each pair of cylinders alternately and there is alternate admission of air into a crank chamber and admission of air into the passageway from said crank chamber to the reservoir and into the explosive end of a cylinder, substantially as set forth.

7. An internal combustion engine including a plurality of cylinders, each cylinder having an explosive end and an air pumping end, pistons therein, a crank shaft connected with said pistons so that they will operate in succession, a crank chamber for each cylinder which is in communication with the outer portion of the air pumping end of its cylinder, and with the inner portion of the air pumping end of the other cylinder, an air passageway from each crank chamber to the explosive ends of the cylinders, a single valve mechanism having ports for controlling the admission of air into said crank chambers and from said chambers to the passageways leading to the explosive ends of the cylinders arranged so that the admission of air into each crank chamber and the passage of air therefrom will be alternate, and means for operating said valve mechanism.

In witness whereof, I have hereunto affixed my signature in the presence of the witnesses herein named.

LAFE V. PENCE.

Witnesses:
G. H. BOINK,
O. M. McLAUGHLIN.

Copies of this patent may be obtained for five cents each, by addressing the "Commissioner of Patents, Washington, D. C."